United States Patent [19]

Le Comte

[11] Patent Number: 4,469,334
[45] Date of Patent: Sep. 4, 1984

[54] SEALING SYSTEM FOR THE AIR CUSHION OF AN AIR-CUSHION VESSEL

[75] Inventor: Adolf Le Comte, New Rochelle, N.Y.

[73] Assignee: Le-Comte Holland B.V., Vianen, Netherlands

[21] Appl. No.: 484,563

[22] Filed: Apr. 13, 1983

[30] Foreign Application Priority Data

Jul. 13, 1982 [NL] Netherlands ................. 8202838

[51] Int. Cl.³ .................. F16J 15/16; B60V 1/16
[52] U.S. Cl. ................... 277/12; 180/116; 180/127
[58] Field of Search ........... 277/12, 32; 180/7.1, 180/116, 123, 124, 126–128

[56] References Cited

U.S. PATENT DOCUMENTS

| | | | |
|---|---|---|---|
| 3,379,270 | 4/1968 | Hardy et al. | 180/127 |
| 3,483,939 | 12/1969 | Maddock et al. | 180/127 |
| 3,532,180 | 10/1970 | Ford et al. | 180/126 |
| 3,709,318 | 1/1973 | Ferguson | 180/116 |
| 4,046,216 | 9/1977 | Cook | 180/127 |
| 4,083,425 | 4/1978 | Rickards | 180/127 |
| 4,133,282 | 1/1979 | Cockerell | 180/128 X |
| 4,137,987 | 2/1979 | Plackett | 180/126 |
| 4,151,893 | 5/1979 | Mantle | 180/116 |

FOREIGN PATENT DOCUMENTS

| | | | |
|---|---|---|---|
| 2015803 | 10/1970 | Fed. Rep. of Germany | 180/127 |
| 1812374 | 2/1978 | Fed. Rep. of Germany | 180/116 |
| 2906920 | 8/1979 | Fed. Rep. of Germany | 180/127 |
| 2038170 | 1/1971 | France | . |
| 2418131 | 9/1979 | France | . |
| 952769 | 3/1964 | United Kingdom | 180/128 |
| 1004646 | 9/1965 | United Kingdom | . |
| 1147633 | 4/1969 | United Kingdom | 180/127 |
| 1309745 | 3/1973 | United Kingdom | . |

Primary Examiner—Robert S. Ward
Attorney, Agent, or Firm—Weingarten, Schurgin, Gagnebin & Hayes

[57] ABSTRACT

A sealing system for the air cushion of an air-cushion vessel comprising rigid sidewalls designed as buoyant bodies, and at least at the front between the rigid walls a series of adjacent, interconnected sealing elements sealing the air cushion, each of which sealing elements is a voluminous, rigid body which at one end can be hingedly connected to the vessel bottom. Means are provided for limiting the free hingeing movement of the rigid sealing bodies relative to each other. In a preferred embodiment of the invention, the ends of all rigid bodies remote from the hinge point can be connected by means of a flexible air-tight flap to the bottom of the vessel, to form a space that can be connected to a source of compressed air, such as a blower. In another embodiment the length of the flaps is adjustable, to facilitate trimming.

7 Claims, 6 Drawing Figures

SEALING SYSTEM FOR THE AIR CUSHION OF AN AIR-CUSHION VESSEL

The invention relates to a sealing system for the air cushion of an air-cushion vessel comprising rigid sidewalls designed as floating or buoyant bodies, and at least at the front between the rigid sidewalls, a series of adjacent, interconnected elements sealing the air cushion.

Such sealing systems have been employed in practice for some years in air-cushion vessels, also called Hovercraft. The sealing elements usually comprise a series of adjacent, folded skirts or fingers made of rubber or a fibre-reinforced rubber layer, which skirts or fingers are connected on the one end at the top by means of a flap to the bottom of the air-cushion vessel, while the rear corners of the folded skirts are likewise connected to the vessel via ropes.

This known air-cushion sealing system, true, ensures quite adequate sealing for the air cushion, but is highly vulnerable. In practice, it cannot be prevented that one or more of said skirts is damaged by obstacles floating on the water or e.g. present on the landing place, which results in a substantial loss of air from the air cushion underneath the vessel. Practice teaches that said fingers or skirts have an average life of 300 hours, while e.g. about 120 fingers may be applied in transverse direction of the vessel. For 2,000 working hours of an air-cushion vessel, about eight complete new finger sets should be applied and this requires, in addition to high cost of material, also a substantial quantity of working hours.

It is an object of the invention to provide a sealing system of the above type having a substantially longer life through a proper sealing of the air cushion and sufficient flexibility, so that the form of the sealing system can adjust to high waves and incidental obstacles floating on the water or present on the landing place.

To this effect the sealing system according to the invention is characterized in that each sealing element is a voluminous, rigid body pivotally connectible with one end to the bottom of the vessel.

By choosing for the sealing elements voluminous, rigid bodies of low specific gravity, the sealing system contributes to the buoyancy of the air-cushion vessel. A very suitable material for the rigid sealing bodies is one comprising polyaramide fibres and resin, which is known by the name of KEVLAR. The attachment of these rigid sealing bodies underneath the ship by means of a hinged suspension is considerably simpler than the known attachment methods with ropes.

Preferably, each rigid sealing body is provided at the side facing the adjoining bodies with means for limiting the free hinging movement relative to the two adjoining bodies, said means comprising a projection disposed on a sidewall of each body and extending into a recess provided in the sidewall of the adjacent body and being movable in said recess with a limited stroke.

As a result of this limited possibility of movement of each sealing body relative to the adjacent sealing bodies, it is achieved that upon mutual rotation of two adjacent sealing bodies, the sealing of the air cushion is preserved, while the sealing system can thus adjust to the obstacles floating on the water or to wave forms.

In order to facilitate the relative movement of the sealing bodies, a low-friction coating is applied to the sidewall of each body.

In order to substantially entirely prevent loss of air from the air cushion via the series of rigid sealing bodies constituting the sealing system, the ends of all rigid bodies remote from the hinge point are connectable via a flexible, air-tight flap to the vessel bottom in such a way that the space enclosed by the series of rigid bodies, said flap and the vessel bottom is shut off from the air cushion to be formed underneath the vessel. At the interface between two adjacent sealing bodies there are provided cuts in order not to impede the relative mobility of the sealing bodies.

Moreover, by making points of attachment of the flap to the separate bodies slidable, the possibility is created to enlarge or reduce the surface on which the pressure of the air cushion acts and thus to influence the proper equilibrium condition.

In a further embodiment of the invention, the length of the flexible flap is adjustable, which may be effected for instance by connecting one end of the flexible flap to a rotary shaft. By changing the length of the flexible flap, both the pressure on the rigid bodies and the total air volume underneath the vessel are changed, thereby displacing the point of application of the vertical reaction force of the air cushion, so that trimming occurs.

A different manner of realizing such trimming consists in that the space enclosed by the vessel bottom, the flexible flap and the rigid bodies communicates with a source of compressed air, e.g. a blower.

Some embodiments of the sealing system according to the invention will now be described, by way of example, with reference to the accompanying drawings, in which.

Figure 1:
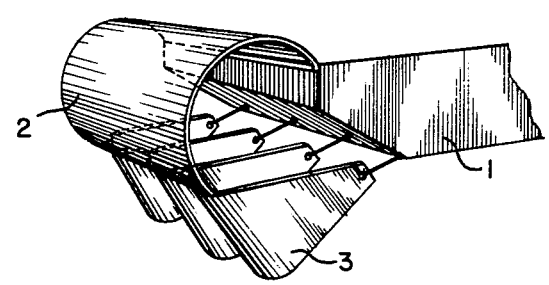
FIG. 1 shows a known sealing system.

The diagrammatic drawing of FIG. 1 shows a known and conventional sealing system by means of which the air cushion underneath an air-cushion vessel is sealed relative to the surroundings. Attached to the bottom of the vessel is a flap 2 whose underside is connected to a series of folded skirts of fingers 3 the back of which is connected through ropes to the bottom 1 of the vessel. It will be clear that the two sidewalls of the vessel in FIG. 1 have been omitted for the sake of clarity.

Figure 2:
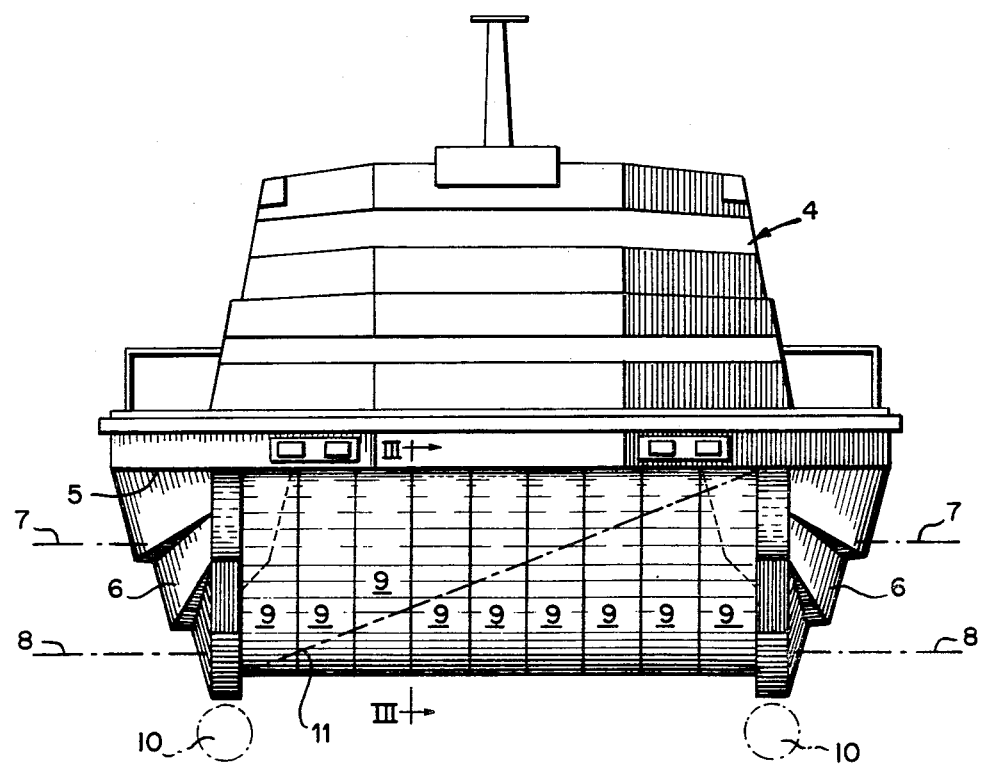
FIG. 2 is a front elevational view of an air-cushion vessel fitted with the sealing system according to the invention.

FIG. 2 is a front elevational view of an air-cushion vessel. The vessel consists essentially of a superstructure 4, a bottom 5 at the underside of which there are provided on either side sidewalls 6 designed as buoyant bodies. Between said sidewalls a series of sealing bodies 9 are positioned side by side so that underneath the bottom 5 of the vessel there is a closed spaced in which an air cushion can be built up. Reference numeral 7 designates the water level in case the vessel should sail without air cushion. By means of the air cushion the vessel is lifted partly out of the water, as indicated at numeral 8. At the rear of the vessel there are disposed two propellers 10 which optionally are displaceable in vertical direction, so that during sailing they can be lowered to beneath the lower edge of the sidewalls and during landing they can be lifted to above said lower edge of the sidewalls 6.

Each sealing body 9 is arranged to perform a limited pivoting movement relative to the adjoining sealing bodies 9 about the hinge point of the sealing bodies, as will be further explained in the following. The line 11 shows the maximum rotation of the sealing bodies 9. When the leftmost sealing body is in the lowest position, the rightmost sealing body can occupy a position approximately parallel to the bottom 5 of the vessel, in which case the ends of the intermediate sealing bodies 9 lie on the line 11.

Figure 3:
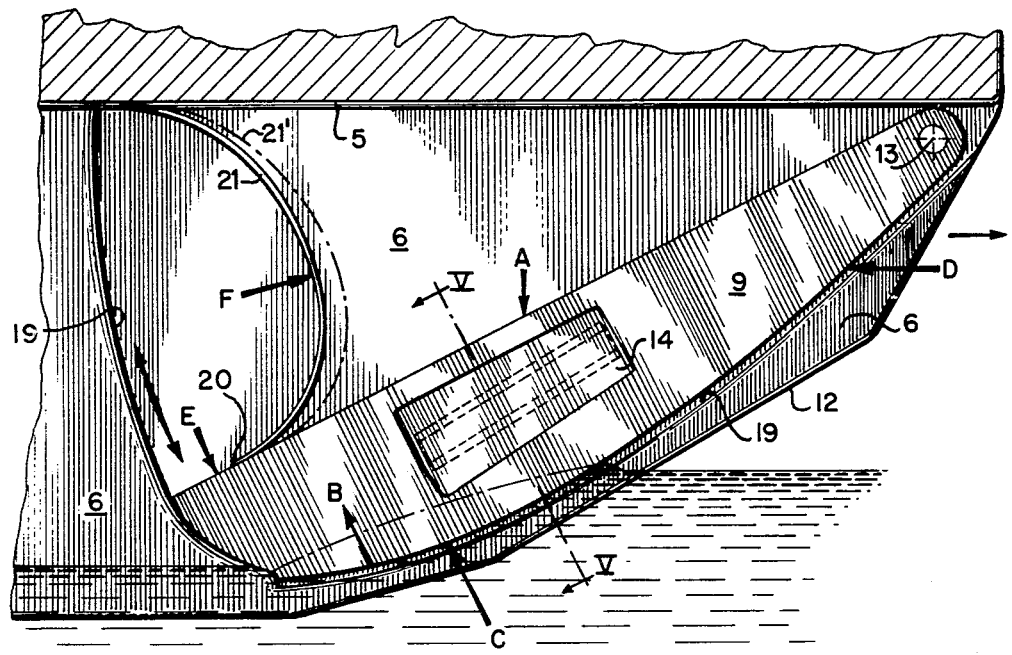
FIG. 3 is a cross section on the line III—III of FIG. 2.
Figure 4:
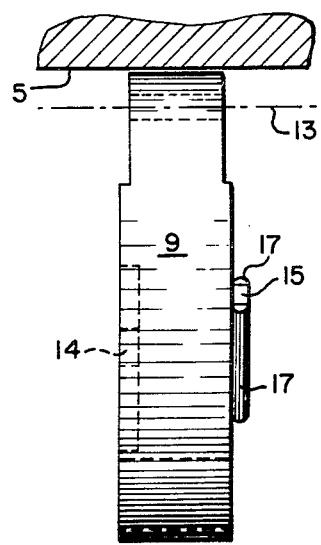
FIG. 4 is a front view of a single rigid sealing body in the position shown in FIG. 3.
Figure 5:
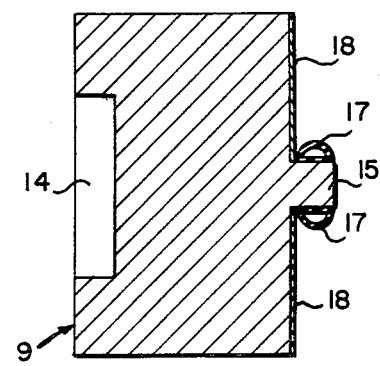
FIG. 5 is a cross section through a sealing body on the line V—V of FIG. 3.

FIGS. 3–5 show the voluminous, rigid sealing bodies 9 in the sailing position of the ship. The space for the air cushion is bounded at the top by the bottom 5 of the vessel and at the sides by the sidewalls 6, the front boundary line of which is designated by numeral 12. The sealing elements 9 are hingedly attached to stub shafts 13, which are attached to the underside of the bottom 5. At the sidewalls there is provided an inwardly directed edge 19, which limits the outward movement of the sealing bodies 9. As best shown in FIGS. 4 and 5, each sealing body 9 comprises a chamber 14 recessed in said body, while at the other side there is provided a projection 15, which comes to lie in the recess 14 of the adjoining sealing body 9. Usually, a rubber stop 17 is disposed on the top and underside of said projection 15, functioning as a shock damper during the contact of the projection 15 against the sidewalls of the recess 14.

In order to reduce friction between two adjoining sealing bodies 9, one side face of each sealing body 9 is provided with a layer 18 of a low-friction material. The dimensions of the recess 14, on the one hand and the projection 15 with the rubber stops 17, on the other, are such that the series of sealing bodies can occupy relative positions as indicated by line 11 in FIG. 2.

The end of each sealing body 9 remote from the hinge point 13 is connected at 20 to a flexible, air-tight flap 21, which is attached at the top to the bottom 5 of the vessel. In the presence of that flap 21 the space bounded by the bottom 5, the flap 21 and the upper wall of the series of sealing bodies 9 is insulated from the air cushion produced at the lefthand side of the flap 21, so that the pressure of the air cushion only acts on the rearmost portion of each sealing body 9. The joint 20 of the flap 21 with the sealing bodies 9 is displaceable in the direction of the hinge point 13, so that the flap 21 may for instance assume the position as shown by dotted line 21′. Owing to this displacement of the joint 20, the surface of each sealing body 9 exposed to the pressure of the air cushion is enlarged or reduced and there is thus obtained a possibility of control to bring the sealing bodies 9 in an optimum position.

Some dimensions will be specified by way of example. With an air-cushion vessel 30 m. long and 12.5 m. wide, the height of the sidewalls is about 4 m. The longest length of each sealing body 9 is 6 m. The width of each sealing body 9 is about 35 cm, while the largest thickness of a sealing body 9 is about 55 cm. The sealing bodies are preferably made of KEVLAR material, being a combination of polyaramide fibres with resin, while a reinforced coating may be applied to the front of each sealing body.

The position occupied by the sealing bodies 9 during sailing is determined as a resultant of a complicated play of forces. In downward direction two forces act on each sealing body, i.e. gravity (arrow A) and the pressure exerted by the air cushion on the end of each sealing body (arrow E). In upward direction a force acts on the sealing bodies 9 that is proportional to the immersed volume of the sealing bodies 9 (arrow B), as well as a lift produced by the angle of the bodies 9 in sailing condition, projected relative to the water level (arrow C), as well as a lift produced by the surface of the total of the sealing elements 9 exposed to the wind speed (arrow D).

Arrow F designates the force that the air cushion exerts on the flap 21.

Flap 21 comprises at the underside cuts at each interface between two adjoining sealing bodies 9, so that each sealing body is not hindered by the flap 21 during the pivoting movement relative to adjoining bodies 9. By displacing the flap 21, the area of the surface of the bodies 9 exposed to the air pressure of the air cushion can be controlled, so that with a given sailing speed, the sealing bodies 9 can be brought in an optimal position.

Figure 6:
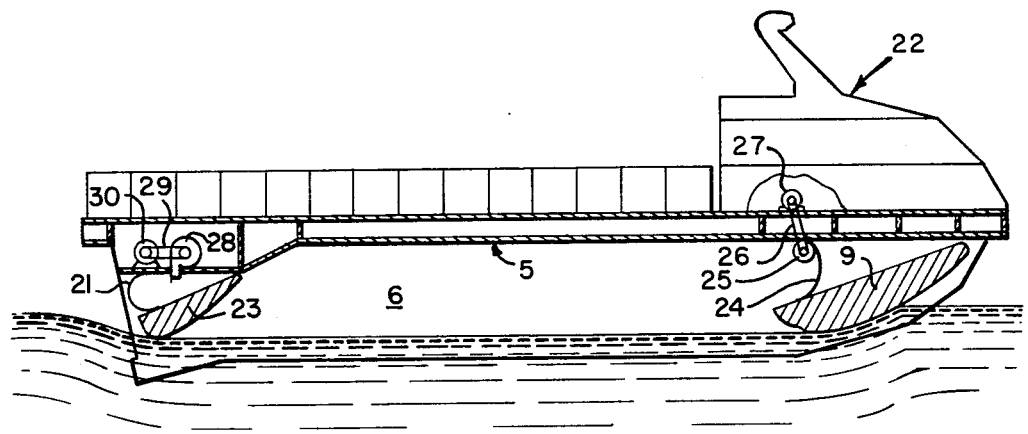
FIG. 6 is a longitudinal section of an air-cushion vessel with two other embodiments of the sealing system.

In the air-cushion vessel shown in FIG. 6, with a known superstructure, generally indicated by 22, sealing bodies 9 are provided at the front which entirely correspond with those described in the above with reference to FIGS. 1–5. At the rear there are provided sealing bodies 23, which, true, have a different shape, but this is no condition for a proper operation.

The difference from the construction shown in FIGS. 1–5 resides in that an air-tight flap is disposed at the front of the sealing bodies 9, the end of which remote from said bodies is mounted on a shaft 25, which can be rotated through a chain 26 by a motor 27. This creates the possibility to change the effective flap area and thereby both the total air volume underneath the vessel and the pressure on the bodies 8. Due to the "bulging" of the flap 24 under the influence of the pressure, this automatically seals against the bottom 5 of the vessel.

With the sealing bodies 23 at the rear of the vessel use is made of a construction equal to that described with reference to FIGS. 1–5. The difference resides in that the space enclosed by the sealing bodies 23, the air-tight flap 21 and the bottom 5 of the vessel communicates with a flower 28, which can be driven by a motor 30 through a chain 29. As a result, there is a possibility of trimming also at the rear of the vessel.

What I claim is:

1. A sealing system for the air cushion of an air-cushioned vessel comprising rigid sidewalls designed as buoyant bodies, and at least at the front between said rigid sidewalls a series of adjacent, interconnected elements sealing the air cushion comprising a voluminous rigid body having one end hingably connected to the bottom of said air-cushioned vessel, wherein each rigid body is provided at the side facing the adjoining bodies with means for limiting the free hinging movement relative to the two adjoining bodies, said means comprise a projection disposed on a sidewall of each body, which projection extends into a recess in the sidewall of the adjacent body and is movable in said recess with a limited stroke.

2. A sealing system according to claim 1 wherein the ends of all rigid bodies remote from the hinge point are connectable via a flexible, air-tight flap to the bottom of the vessel in such a way that the space enclosed by the series of rigid bodies, said flap and the bottom of the vessel is shut off from the air cushion to be formed underneath the vessel.

3. A sealing system according to claim 2, wherein the flexible flap is provided with a cut at the side facing the rigid bodies, at each interface between two rigid bodies, in such a way that adjoining bodies can move relatively to each other while maintaining an air-tight seal by the flap.

4. A sealing system according to claim 2, wherein joints of the flexible flap with the rigid bodies are displaceable in the direction of the hinge point of the rigid bodies.

5. A sealing system according to claim 2, wherein the length of the flexible flap is adjustable.

6. A sealing system according to claim 5, wherein the one end of the flexible flap is wound on a rotary shaft.

7. A sealing system according to claim 2, wherein the space enclosed by the bottom of the vessel, the flexible flap and the rigid bodies communicates with a compressed air source, e.g. a blower.

* * * * *